May 3, 1966 G. MOL ETAL 3,249,699

BUSY TEST ARRANGEMENT FOR A TELEPHONE SWITCHING NETWORK

Filed Dec. 7, 1962 7 Sheets-Sheet 1

INVENTORS
GERRIT MOL &
MATTHEUS J. SCHMITZ
BY
Frank R. Trifari
AGENT

BUSY TEST ARRANGEMENT FOR A TELEPHONE SWITCHING NETWORK

Filed Dec. 7, 1962 7 Sheets-Sheet 2

INVENTORS
GERRIT MOL &
MATTHEUS J. SCHMITZ
BY
Frank R. Trifari
AGENT

INVENTORS
GERRIT MOL
MATTHEUS J. SCHMITZ
BY
Frank R. Jinfani
AGENT

May 3, 1966 G. MOL ETAL 3,249,699

BUSY TEST ARRANGEMENT FOR A TELEPHONE SWITCHING NETWORK

Filed Dec. 7, 1962 7 Sheets-Sheet 4

INVENTORS
GERRIT MOL &
MATTHEUS J. SCHMITZ
BY
Frank R. Jeffrey
AGENT

BUSY TEST ARRANGEMENT FOR A TELEPHONE SWITCHING NETWORK

Filed Dec. 7, 1962 7 Sheets-Sheet 5

INVENTORS
GERRIT MOL
MATTHEUS J. SCHMITZ
BY
Frank R. Jifari
AGENT

BUSY TEST ARRANGEMENT FOR A TELEPHONE SWITCHING NETWORK

Filed Dec. 7, 1962 7 Sheets-Sheet 6

INVENTORS
GERRIT MOL &
MATTHEUS J. SCHMITZ
BY
Frank R. Jeffrey [signature]
AGENT May 3, 1966 G. MOL ETAL 3,249,699

BUSY TEST ARRANGEMENT FOR A TELEPHONE SWITCHING NETWORK

Filed Dec. 7, 1962 7 Sheets-Sheet 7

INVENTORS
GERRIT MOL
MATTHEUS J. SCHMITZ
BY
Frank R. Jeifari
AGENT

United States Patent Office 3,249,699
Patented May 3, 1966

3,249,699
BUSY TEST ARRANGEMENT FOR A TELEPHONE SWITCHING NETWORK

Gerrit Mol and Mattheus Jacobus Schmitz, Hilversum, Netherlands, assignors to North American Philips Company Inc., New York, N.Y., a corporation of Delaware Filed Dec. 7, 1962, Ser. No. 243,144
Claims priority, application Netherlands, Dec. 12, 1961, 272,460
5 Claims. (Cl. 179—18)

The invention relates to a circuit arrangement for determining the free state or the busy state of the links of a switching network that does not provide test wires, and in which each link has, in the free state, a voltage differing from that in the busy state. The need for such an arrangement arises, for example, in a telephone exchange controlled by a central control-member, particularly in an electronic telephone exchange having a "one wire" speech channel network. The construction of such a telephone exchange involves the difficulty that a free channel between a given input and a given output of the speech channel network must be found, but due to their high cost, test wires for determining the free state or the busy state of the links are omitted. The above system has the disadvantage that the member in which the states of the links are recorded receives its data indirectly, i.e. from the control-member. The knowledge whether a given link is free or busy is therefore not derived from the link itself, so that the possibility of errors is increased. It will be obvious that this is a disadvantage, since a link incorrectly recorded as being busy would permanently remain recorded as being busy, if no special precautions were taken, so that said link would no longer be employable for the formation of a channel. Conversely, a link incorrectly recorded as being free, which link is thus engaged in a communication, might be used for the formation of a different communication, so that two communications would be established via said link, which would always have undesirable consequences. Such erroneous recordings may occur owing to disturbances of the apparatus. These disadvantages can be partly obviated by using a control-arrangement which checks each transmission of information in the exchange with regard to errors and which produces an error signal as soon as an error is stated. Said signal may be used for giving an alarm signal which may, if desired, contain the information about the wires by way of which erroneous information transmission is made, or for repeating the information transmission concerned or for carrying out these two measures in common. If the exchange is arranged so that it is indicated at given places which members of the exchange are busy at the instant concerned, and by way of which channels these members are connected to each other, it is possible to erase completely the link storage from time to time and to record again which links of the switching network are occupied. It is furthermore possible to use an indication that none of the members of the exchange is connected to the speech channel network in order to erase all rudiments of any erroneous recordings. However, this requires a complication of the control of the exchange, which the invention tends to avoid. The invention has for its object to achieve this by connecting each link to the control-terminal of a gate. The gate is opened in one state of the link and is closed in the other state of the link, and each gate is included in the circuit of a circuit element, which is, in the open state of the gate, in a detectable state differing from that in the closed state of the gate. The gate may be a transistor, the base of which is connected to the relevant link. The assembly is preferably arranged so that the transistor is non-conducting when the link concerned is busy and is conducting when the said link is free, since this results in the minimum amount of damping of a conversation held by way of the link. The circuit element having a detectable state may be an annular core of a material having a rectangular hysteresis loop, which is provided with a number of windings.

The invention will be described more fully with reference to the drawing, in which.

Figure 1:
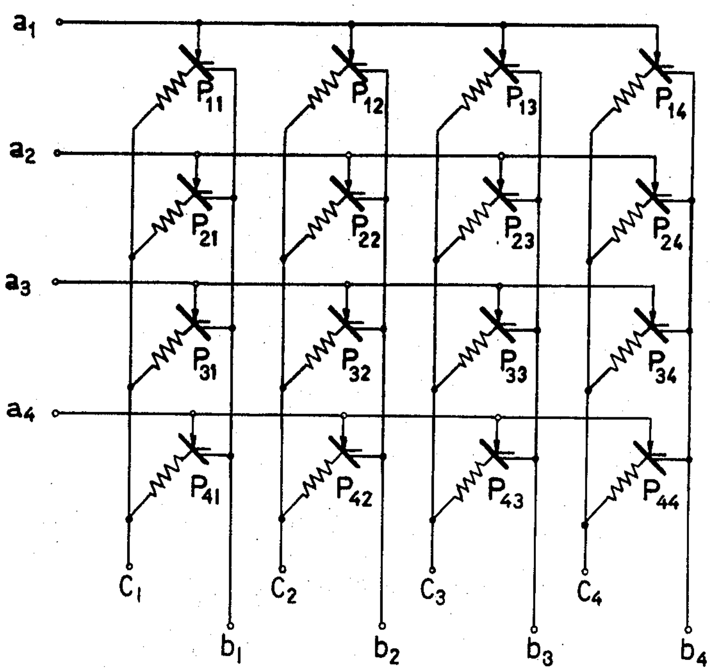
FIG. 1 is a diagram of a switching matrix which may be employed in the system of the invention.
Figure 2:
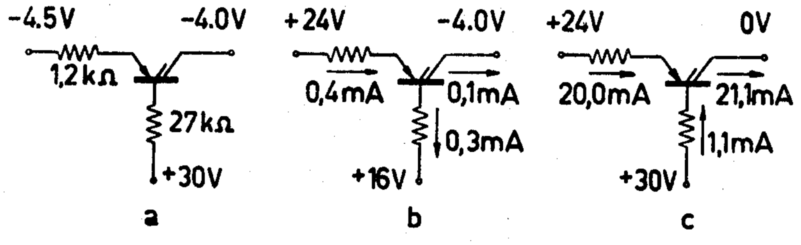
FIG. 2 illustrates the voltages at the electrodes of the pnpn-transistors used as crossings in the switching matrix of FIG. 1 in the rest position (FIG. 2*a*), during the marking process (FIG. 2*b*) and in the conducting state (FIG. 2*c*)

FIG. 1 shows a switching matrix suitable for use in a switching network having the required properties. In this figure $a_1$, $a_2$, $a_3$, $a_4$ designate a set of input wires, $b_1$, $b_2$, $b_3$, $b_4$ a set of output wires, and $c_1$, $c_2$, $c_3$, $c_4$ a set of marking wires. Each input wire *a* is connected by way of a separate gate P to each output wire *b*. The coordinates of the P gates correspond to the coordinates of the input and output wires. Thus, $P_{23}$ is the gate between input wire $a_2$ and output wire $b_3$. The marking wires *c* are connected to the control terminals of the gates with the coordinates of the *c* wires being the same as the *b* wires. Each gate comprises a transistor having a current amplification factor exceeding 1, for example a pnpn-transistor. The emitter of the transistor constitutes the input and is connected to the relevant *a*-wire, the collector constitutes the output and is connected to the relevant *b*-wire and the base is connected by way of a resistor to the relevant *c*-wire. The end of this resistor remote from the base constitutes the control-terminal of the gate. In the rest position of the switching matrix all input wires have a voltage of —4.5 v., all output wires have a voltage of —4.0 v. and all marking wires have a voltage of +30 v. Each transistor is then in the state illustrated in FIG. 2*a* and is blocked. If, for example, the input wire $a_2$ must be connected to the output wire $b_3$, the voltage of the input wire $a_2$ is raised to +24 v. and the voltage of the marking wire $c_3$ is reduced to +16 v. The transistor thus arrives in the state illustrated in FIG. 2*b* and becomes conducting. A particularity of this arrangement resides in that the transistor, even after the marking voltage of +16 v. has dropped, remains conducting, i.e. even after the marking wires have resumed the voltage of +30 v. The latter is due to the voltage difference produced by the base current via the resistor in the base circuit of the transistor. The transistor even remains conducting, when the voltage of the output wire $b_3$ is raised to about 20 v., which may indeed be the case, as will be described more fully hereinafter. Then the transistor arrives in the state illustrated in FIG. 2*c*.

Figure 3:
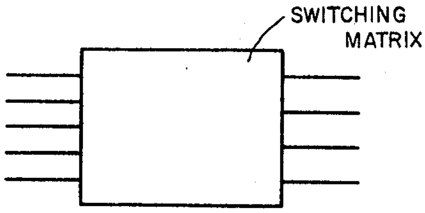
FIG. 3 shows the symbol used for a switching matrix in FIG. 4.

FIG. 3 shows the symbol to be used in the circuit diagrams for designating a switching matrix such as shown in more detail, for example, in FIG. 1.

Figure 4:
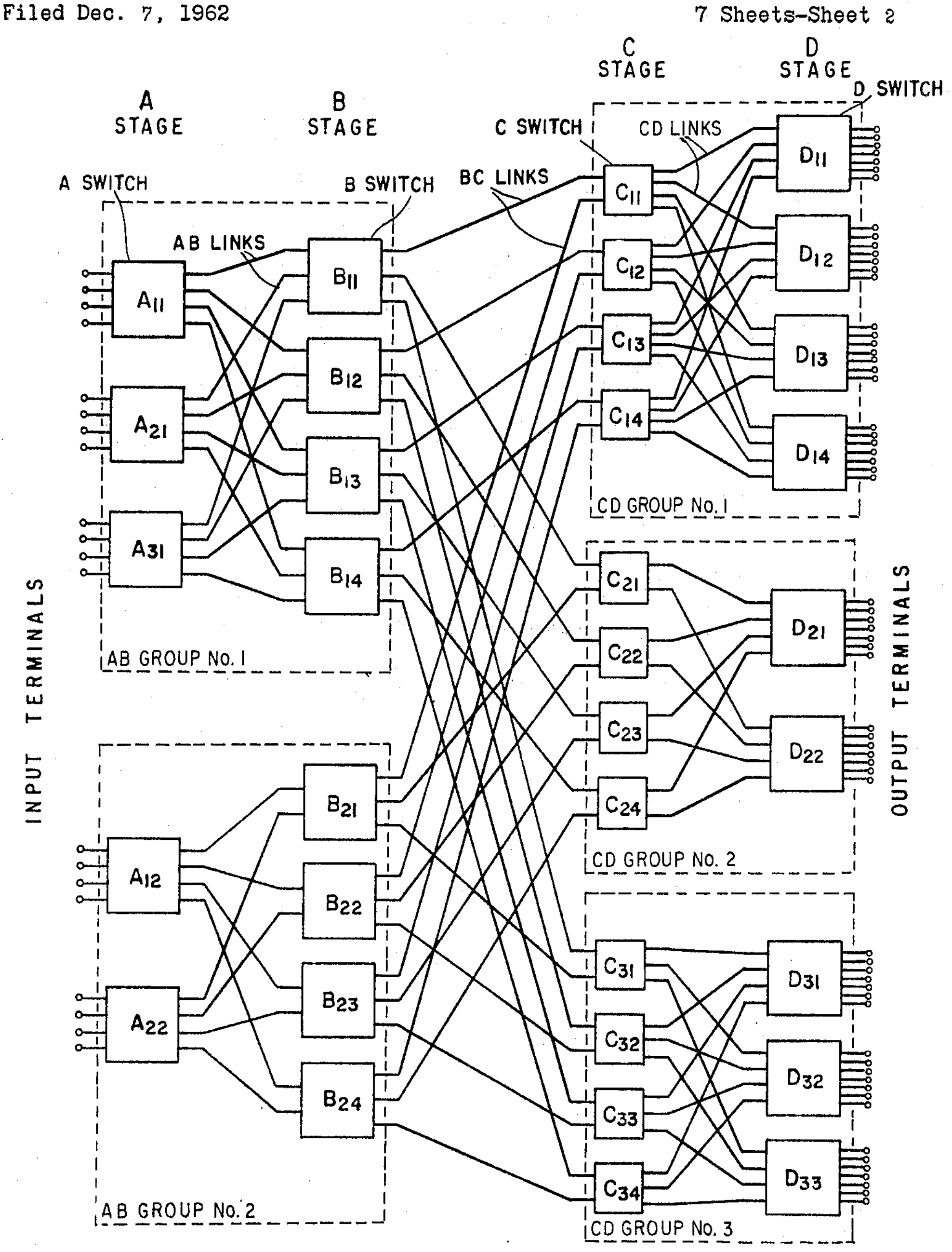
FIG. 4 is a block diagram illustrating the interconnection of the switching matrices to form a switching network.

FIG. 4 illustrates the principle of the manner in which the switching matrices in a large switching network may be connected. This switching network has four switching stages, i.e. the A-stage, the B-stage, the C-stage and the D-stage. The switching matrices forming together the A-stages are termed the A-switches. For the switches of the B-, C- and D-stages the similar designation is used. The A- and B-switches are arranged in two AB-groups. The first AB-group comprises three A-switches and four B-switches. The C- and D-switches are arranged in three CD-groups. The first CD-group comprises four C-switches and four D-switches, the second CD-group comprises four C-switches and two D-switches, the third CD-group comprises four C-switches and three D-switches. Each A-switch can be indicated by two coordinates corresponding to the number of the A switch in the AB-group, and the number of the AB group. Thus, A-switch $A_{31}$ is the third A-switch of the first AB-group. Each D-switch is indicated by two coordinates corresponding to the number of the CD group and the number of the D switch in the CD group, so that $D_{21}$ is the first D-switch of the second CD-group. The B- and C-switches are each indicated by two coordinates corresponding to the number of the group in which the respective switch is located, and the number of the switch in the group respectively. Thus, switch $B_{12}$ is the second B-switch of the first AB-group and $C_{42}$ is the second C-switch of the fourth CD-group. Each input of the switching network is indicated by a triple of co-ordinates. For example the input (3, 2, 1) is the third input of the second A-switch of the first AB-group. Each output of the switching network is indicated by a triple of coordinates. For example, the output (2, 1, 5) is the fifth output of the first D-switch of the second CD-group. The connecting wires between each A-switch and each B-switch are termed B-links, the connecting wires between each B-switch and each C-wire are termed BC-links and the connecting wires between each C-switch and each D-switch are termed the CD-links. The so-called link pattern of the switching network shown in FIG. 4 is the following. The number of the output of an A-switch is the same as the number of the B-switch connected thereto. The number of a B-switch is the same as the number of the output of the A-switch connected thereto. An AB-link can therefore be indicated by a quadruple of coordinates in which the first coordinate indicates the number of the A-switch within the relevant AB-group, from which the AB-link starts, the second coordinate indicates the number of the AB-group within which the AB-link extends, the third coordinate indicates the number of the B-switch within the relevant AB-group, to which the AB-link extends and the fourth coordinate is 1, which indicates that the link is an AB-link. The number of the output of a B-switch is the same as the number of the CD-group to which it is connected. The number of the input of the C-switch is the same as the number of the AB-group to which it is connected. The numbers of the B and C-switches in their respective groups are the same. A BC-link can therefore be indicated by a quadruple of coordinates in which the first coordinate indicates from which AB-group the BC-link starts, the second coordinate indicates to which CD-group the BC-link extends, the third coordinate indicates between which B- and C-switches of the relevant AB- and CD-groups the BC-link extends and the fourth coordinate is 2, which indicates that the link is a BC-link. The number of the output of a C-switch is the same as the number of the D-switch connected thereto. The number of the input of a D-switch is the same as the number of the C-switch connected thereto in the respective CD-group. A CD-link can therefore be indicated by a quadruple of coordinates in which the first coordinate indicates the CD-group within which the CD-link extends, the second coordinate indicates the D-link within the CD-group, to which the CD-link extends, the third coordinate indicates the C-switch within said CD-group, from which the CD-link starts and the fourth coordinate is 3, which indicates the link is a CD-link. This switching pattern requires for the AB-group to have the same number of B-switches and the CD-groups to have the same number of C-switches. This number is four in the system of FIG. 4. Each B-switch has furthermore a number of outputs equal to the number of CD-groups and each C-switch has a number of inputs equal to the number of AB-groups. Similar relations prevail between the numbers of outputs of the A-switches and the inputs of the B-switches and the numbers of outputs of the C-switches and the inputs of the D-switches. In the switching network shown a certain degree of irregularity is provided in order to mark out the generality of the link pattern. This may be generalized still further by replacing each link by a number of parallel links. A further generalization, which may, if desired, be employed in conjunction with the aforesaid generalisation, consists in that parts of switching matrices of the same switching stage are united to form a larger switching matrix. The last-mentioned generalisation comes down to a certain degree of mixing and provides the advantage involved, i.e. a reduction of the possibilities of stagnation and an increase in the efficiency of given links.

Referring to the link pattern shown in FIG. 4, a number of channels can be built up between each arbitrary input and each arbitrary output of the switching network, each channel extending by way of a different B-switch and hence also via a different C-switch. These channels can therefore be distinguished from each other by a coordinate which designates the channel number. Between each input and each output in the system of FIG. 4 there are four channels possible, from which a choice is to be made.

If each link of the switching network shown in FIG. 4 is replaced by for example, three parallel links, a fifth coordinate has to be introduced, which may assume any of the values 1, 2 or 3. The AB-links can then be indicated by the addition of a coordinate corresponding to the number of the parallel link, and for the BC- and CD-links a similar set of addresses can be introduced.

For a switching network with a higher or lower degree of mixing in the B- or in the C-stage other complications are involved, which will be found without difficulty.

Figure 5:
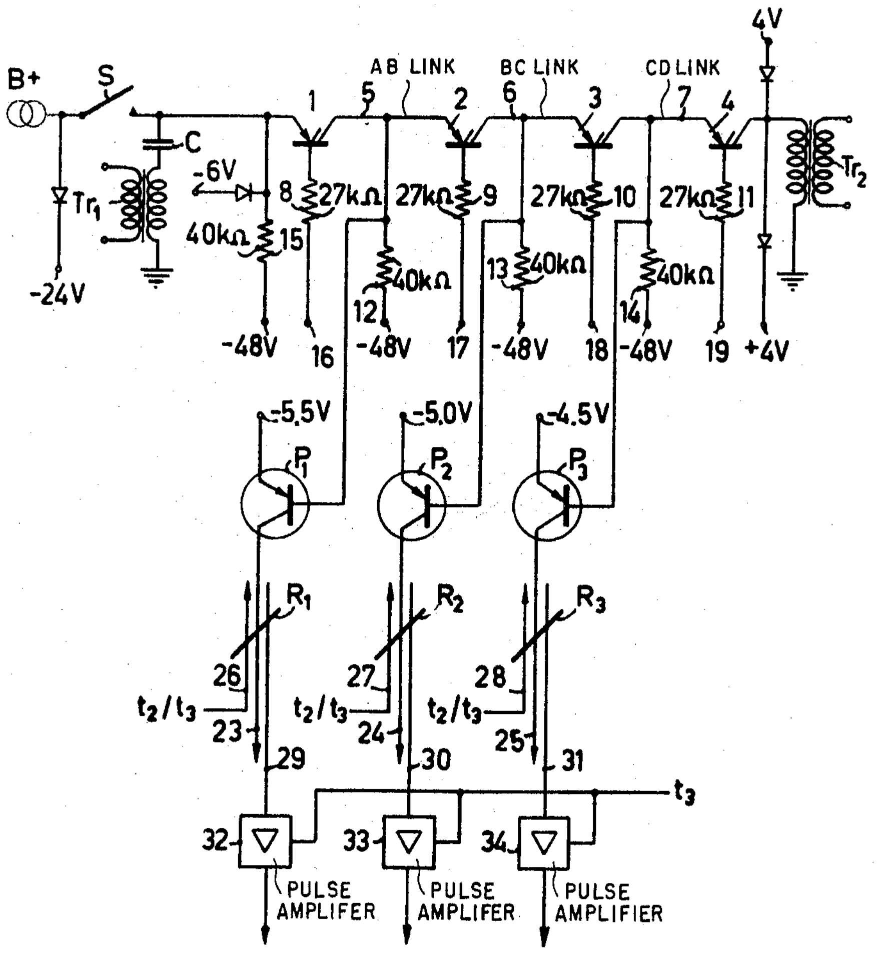
FIG. 5 is a diagram of a channel in a switching network illustrating the manner in which the free and the busy states of the links are detected in accordance with the invention.

FIG. 5 shows in detail the members which form a single channel in the network of FIG. 4. The input of the channel is connected by way of a switch S to a terminal of a current source $B_+$. This terminal is also connected by way of a diode to a voltage source of +24 v. The terminal of the current source $B_+$ is thus held at a voltage of +24 v. The input of the channel is furthermore connected by way of a capacitor C to one winding of a transformer $Tr_1$. By means of this transformer, a signal can be injected into the channel or a signal can be derived from the channel. Finally the input of the channel is connected by way of a resistor 15 to a voltage source of −48 v. and by way of a diode to a voltage source of −6 v. Thus the input of the channel, when the switch S is open, has a voltage of −6 v. and, when the switch S is closed, a voltage of +24 v.

The output of the channel is connected by way of one winding of a second transformer $Tr_2$ to ground and by way of two diodes to voltage sources having voltages of −4 v. and +4 v. The voltage at the output is therefore always between −4 v. and +4 v. By means of the transformer $Tr_2$ a signal can again be injected into the channel or a signal can be derived from the channel.

The channel extends by way of the transistors 1, 2, 3 and 4 and the links 5, 6 and 7. The transistors 1, 2, 3 and 4 are gate transistors in the A, B, C and D stages respectively of the network of FIG. 4, corresponding to gate transistors of the matrix of FIG. 1, and the links 5, 6 and 7 are AB, BC and CD links respectively of the network of FIG. 4. The base of the transistor 1 is connected by way of a resistor 8 to a marking terminal 16. In a similar manner the bases of the transistors 2, 3 and 4 are connected by way of resistors 9, 10 and 11 respectively to a marking terminal 17, 18 and 19 respectively. The AB-link 5 is connected by way of a resistor 12 to a voltage source of —48 v., the BC-link 6 is connected via a resistor 13 to a voltage source of —48 v. and the CD-link 7 is connected via a resistor 14 to a voltage source of —48 v. The AB-link 5 is also connected to the base of a pnp-transistor $P_1$. The emitter of transistor $P_1$ is connected to a voltage source of —5.5 v. The BC-link 6 is connected to the base of a pnp-transistor $P_2$, and the emitter of this transistor is connected to a voltage source of —5.0 v. The CD-link 7 is connected to the base of a pnp-transistor $P_3$, and the emitter of this transistor is connected to a voltage source of —4.5 v. If the circuits connected to the collectors of these transistors are provisionally left out of consideration, these transistors may be considered to be diodes.

The formation or marking of the channel is performed as follows. Initially the switch S is open and the marking terminals 16, 17, 18 and 19 have a voltage of +30 v. The emitter of the transistor 1 has a voltage of —6 v., that of the transistor 2 a voltage of —5.5 v., that of the transistor 3 a voltage of —5.0 v. and that of the transistor 4 a voltage of —4.5 v. The four transistors 1, 2, 3, 4 are therefore blocked by a reverse bias. In order to form the channel the switch S is closed and the voltage of the marking terminals 16, 17, 18 and 19 is reduced to +16 v. Thus the voltage of the emitter of the transistor 1 rises to +24 v. and the voltage at the base of this transistor drops to +16 v. The transistor 1 thus becomes conducting. This results in that the voltage of +24 v. passes to the emitter of the transistor 2, which thus also becomes conducting. This results in that the voltage of +24 v. passes to the emitter of the transistor 3, which in turn becomes conducting. Then the voltage of +24 v. passes to the emitter of the transistor 4, which also becomes conducting. Since the collector of the latter transistor is connected to earth by way of the low resistance of the winding of the transformer $Tr_2$, the voltage of the whole channel between the input and the output thereof will drop to about zero volt. For the reasons already set out with reference to FIGS. 1 and 2 the transistors 1, 2, 3 and 4 remain conducting, even if afterwards the voltage of the marking terminals 16, 17, 18 and 19 is again raised to +30 v. The channel is opened by opening the switch S, since then all transistors are driven back to the non-conducting state. Since the AB-link 5, the BC-link 6 and the CD-link 7 have voltages of —5.5 v., —5.0 v. and —4.5 v. respectively, the collector of each of the transistors 1, 2, 3 and 4 has a slightly higher voltage than the emitter, so that the opening of the switch S results with certainty in these transistors becoming non-conducting. Without this measure, the transistors could remain conducting, owing to leakage currents through the transistors multiplied thereto in the switching matrix, in spite of the opening of the switch S, or in other words, a channel once built up could no longer be broken down. It therefore appears that in the free state a link has a voltage of —5.5 v., —5.0 v. or —4.5 v. and in the busy state it has a voltage of slightly more than zero volt, so that the condition made on the links as stated above is fulfilled. During the formation or marking of a channel, the links over which the channel extends, have very transiently a voltage of about +24 v., but this particularly is not utilised in this case. It will be obvious that a reduction of the voltage from 30 v. to 16 v. at a marking terminal, which is connected to the base of a transistor rendered conducting beforehand, has no influence or has only a slight influence on the channel extending by way of the transistor. This reduction of the voltage at a marking point has no effect on a transistor, the emitter of which does not exhibit a voltage of nearly 24 v., i.e. a voltage of —6.0 v., —5.5 v., —5.0 v. or —4.5 v. Only a transistor, which is connected via a channel portion already built up to a closed switch S, can pass from the nonconducting state into the conducting state. In other words, double marking cannot occur. Each transistor of the switching network can be marked by the coincidence of a marking from an input of the switching network by closing the relevant switch S by way of a channel portion already built up to the transistor and a marking from a marking wire connected to the base of the transistor. This provides a very great simplification of the marking system of the switching network.

In order to assess the free state or the busy state of the AB-link 5 use is made of an arrangement comprising a preferably annular core $R_1$ of a material having a rectangular magnetic hysteresis loop. The core is provided with an input winding 23, connected to the collector of the transistor $P_1$, a reading winding 26 and an output winding, connected to a pulse amplifier 32.

This arrangement operates as follows: in the rest position, in which the AB-link 5 is free, this link has a voltage of —5.5 v. and the transistor $P_1$ is conducting. Thus a current of an intensity $i$ flows through the input winding 23. This current changes over the ring $R_1$ to a magnetic state, which is termed the 0 state. In order to assess the state of the AB-link 5, a current pulse of such intensity is passed through the reading winding 26 that the ring passes from the 0-state to the 1-state, but after the termination of the pulse the core is driven back to the state 0 owing to current through the input winding 23. Thus a positive pulse and a negative pulse are induced into the output winding 29. One of these two pulses is amplified by the pulse amplifier 32 and contains the information that the AB-link 5 is free. It will now be assumed that the AB-link is occupied. The voltage of this link thus rises to slightly above 0 volt and the transistor $P_1$ becomes non-conducting. However, this does not change the state of the ring $R_1$. When a pulse is passed through the reading winding 26, the ring $R_1$ passes to the state 1, but after the termination of the reading pulse, it remains in the state 1. With any further reading pulses no change-over of the ring $R_1$ takes place, so that no more pulses are induced into the output winding 29. In the case of a single reading operation of the ring $R_1$, when an AB-link has just been occupied, the information would erroneously be obtained that the link is free. With subsequent readings of the ring $R_1$ this is no longer the case, since the ring has passed to the state 1 at the first reading, after which it remains in this state until the AB-link 5 is again free. In order to avoid this disadvantage the state of the AB-link may be found by reading twice in succession the ring $R_1$ and by considering only the presence or the absence of pulses at the instant of the second reading as an information about the free state or the busy state of the AB-link. In a different method the amplifier 32 is arranged so that it passes only those amplified pulses, subsequent to amplification, which are induced into the output winding 29, when the ring $R_1$ passes over from the state 1 to the state 0. The further parts of the arrangement may be slightly simplified by providing a controllable pulse amplifier 32 and by arranging the assembly so that this pulse amplifier passes a pulse only when the reading winding 29 can contain an information-supplying pulse.

Figure 6:
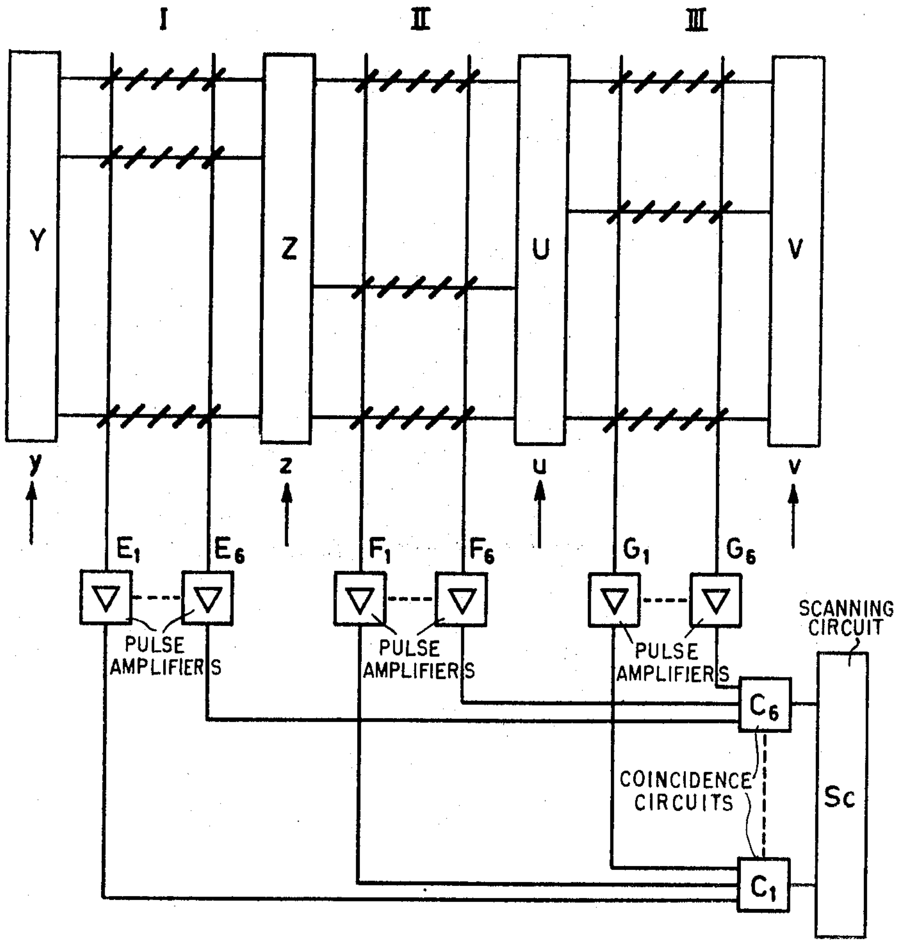
FIG. 6 shows an arrangement for finding the free channels between a given input and a given output of the switching network.

FIG. 6 shows a structure of the member for finding a free channel between a given input and a given output of the switching network. The rings $R_1$, $R_2$, and $R_3$ relating to the AB-links, BC-links and CD-links respectively are arranged in three matrices I, II and III. In each of these three matrices the rings which correspond to the links of the same channel number form together a column of the matrix. Each matrix has therefore a number of columns equal to the number of potential values of the channel number. In FIG. 6 this number is supposed to be 6. Each row of the matrix I, relating to the AB-links comprises rings which correspond to AB-links with addresses in which the first two coordinates have the same values (i.e. the number of the A-switch within the relevant AB-group and the number of the AB-group), but the third coordinate relating to the number of the B-switch within the relevant AB-group has all potential values and hence corresponds to the links (3, 1; 1; 1), (3, 1; 2; 1). (3, 1; 3; 1), (3, 1; 4; 1), (3, 1; 5; 1) and (3, 1; 6; 1). The rings of the matrices II and III are arranged in a similar manner. The members Y, Z, U and V receive information from the control member about the number of the A-switch in the relevant AB-group, the number of the relevant AB-group, the number of the relevant CD-group, and the number of the D-switch within the relevant CD-group (hereinafter referred to as the coordinates *y, z, u* and *v* respectively) of the input and the output between which a channel is to be built up. They ensure that in the matrix I that row is read for which *y* and *z* have the prescribed values, that in the matrix II that row is read for which *z* and *u* have the prescribed values and that in the matrix III that row is read for which *u* and *v* have the prescribed values. It will be supposed, by way of example, that the links (*y, z*; 1; 1), (*y, z*; 3; 1), (*y, z*; 4; 1), (*y, z*; 6; 1), (*z, u*; 2; 2), (*z, u*; 3; 2), (*z, u*; 5; 2), (*z, u*; 6; 2), (*u, v*; 2; 3), (*u, v*; 3; 3), and (*u, v*; 6; 3) are free. When reading the rows (*y, z*), (*z, u*) and (*u, v*) of the matrices I, II and III, the pulse amplifiers $E_1$, $E_3$, $E_4$, $E_6$, $F_2$, $F_3$, $F_5$, $F_6$, $G_2$, $G_3$ and $G_6$ receive then a pulse, which pulses are passed, subsequent to amplification, to the coincidence circuits $C_1$, $C_2$, . . . $C_6$. It appears that only the coincidence circuits $C_3$ and $C_6$ receive a pulse at their three input terminals, so that they state a threefold coincidence, which means that between the input (*x, y, z*) and the output (*u, v, w*) only the channels 3 and 6 are free (wherein *x* is the number of the input to the relevant A-switch and *w* is the number of the output of the relevant D-switch), whereas each of the further channels between said input and output comprises one or more busy links. For example, with channel number 1 the BC- and the CB-links are occupied. The six coincidence circuits are scanned in order of succession by a scanning circuit S*c*. The first coincidence circuit, in which a three fold coincidence has taken place, and which is found by the scanning circuit S*c*, determines the number of the channel which will be built up. It may be efficacious not to provide a fixed starting state or 0-state for the scanning circuit, since this introduces a random element into the choice of the channels to be built up and hence of the transistors of the switching network to be employed, which provides a more uniform distribution of wear or aging of said transistors. Moreover, the average finding time of a free channel is thus reduced, and harmful consequences of a disturbance in a channel having a low channel number are mitigated.

Figure 7:
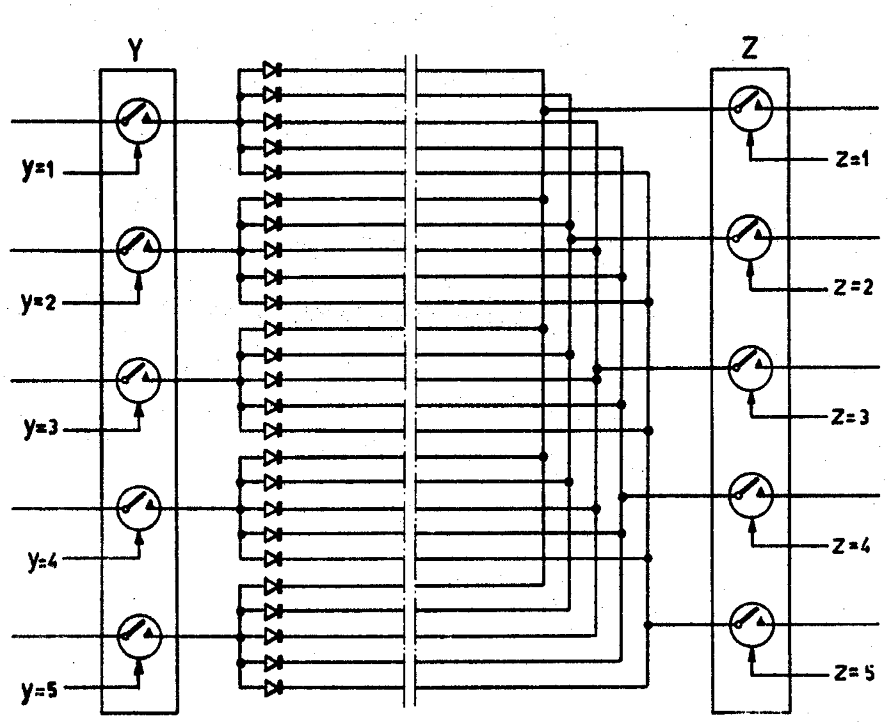
FIG. 7 shows an arrangement for controlling the reading wires of the switching network of FIG. 6.

FIG. 7 shows a possible embodiment of the members Y and Z. The members U and V may be constructed in a similar manner. In FIG. 7 it is assumed that the coordinates *y* and *z* may assume the values 1, 2, 3, 4 and 5. To each value of each of these co-ordinates corresponds a gate, which can be indicated by the value of the relevant co-ordinate. The output of each of the gates of the member Y is connected to the input of each of the gates of the member Z. The wires establishing these connections are the reading wires of the matrix I (FIG. 6) and include each a decoupling diode. When one of the gates of the member Y and one of the gates of the member Z are opened, a current passes through just one reading wire. If the AB-groups do not comprise all the same number of A-switches (as in the switching network shown in FIG. 4), a few wires may, of course, be dispensed with.

Figure 8:
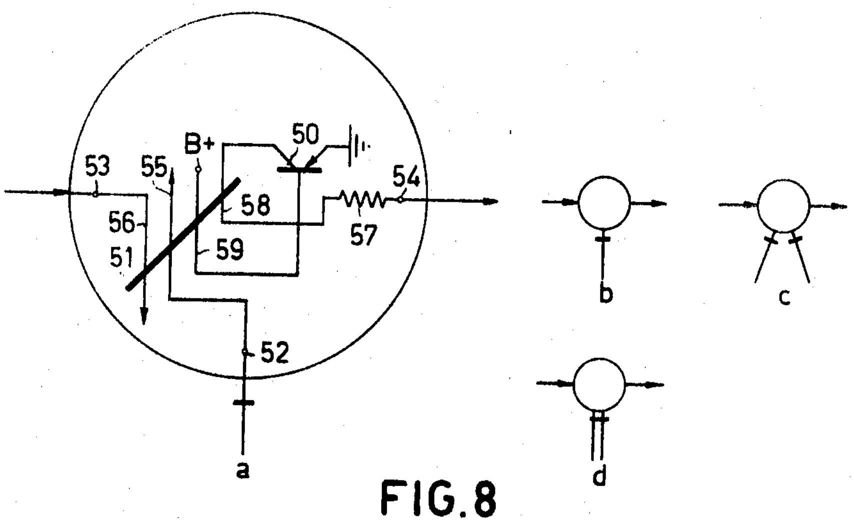
FIG. 8 illustrates a storing pulse generator which may be employed in the system of the invention.

FIG. 8 shows a very practical assembly unit for the various members of an arrangement according to the invention. This assembly unit is termed a storing pulse generator. The assembly unit concerned comprises mainly a pnp-transistor 50 and an annular core 51 of a material having a rectangular hysteresis loop. The pulse generator comprises furthermore an adjusting terminal 52, a firing terminal 53 and an output terminal 54. The adjusting terminal 52 is connected to an adjusting winding 55 of the ring 51. The firing terminal 53 is connected to a firing winding 56. The output terminal 54 is connected via a current-determining resistor 57 is series with a feedback winding 58 of the ring 51 to the collector of the transistor 50. The emitter of said transistor is earthed. The base of the transistor is connected via a control-winding 59 of the ring 51 to a positive voltage source $B_+$. In FIG. 8*a* all windings are shown in the form of one-turn windings, i.e. of a wire threaded through the ring. This has the advantage that the sense of winding can immediately be read. In fact it may be practical or necessary to provide more than one turn for a winding.

The arrangement operates as follows. Normally the transistor 50 is held non-conducting by the voltage source $B_+$. When a pulse of adequate intensity and duration is fed to the adjustable terminal 52, the ring 51 is driven into the magnetic state which is termed the state 1. The pulse generator is then adjusted. During the adjusting operation a voltage is induced into the control-winding 59, which voltage renders the base of the transistor 50 further positive than it was owing to the voltage source $B_+$, so that the transistor remains nonconducting during the adjustment. This is not changed by the fact that the collector of the transistor is rendered slightly negative by the voltage induced into the feedback winding 58. If, in the adjusted state of the pulse generator, a pulse is fed to the firing terminal 53, which pulse has adequate intensity to drive the ring 51 into the steep part of its characteristic curve, a voltage is induced into the control-winding 59, which voltage overcomes the voltage of the voltage source $B_+$ and renders the base of the transistor negative. The transistor thus becomes conducting, so that a current will flow through the feedback winding 58, which current amplifies the effect of the firing terminal and may take it over, as the case may be. This results in that the ring 51, even if the firing pulse had terminated sooner, is completely driven to the state 0 and the pulse generator supplies an output pulse having a sharply defined duration and amplitude, which are substantially independent of the duration and the amplitude of the firing pulse. Only in the adjusted state of the pulse generator it is therefore capable of supplying an output pulse. Firing of a pulse generator not previously adjusted has no effect.

FIG. 8*b* shows the symbols used in diagrams of storing pulse generator. It will be seen that a storing pulse generator may have two adjusting windings. In this case the assembly may be arranged so that the pulse generator is adjustable by feeding an adjusting pulse to either of the two adjusting terminals, whereas it may be arranged so that the pulse generator is adjustable only by feeding simultaneously two adjusting pulses to the two adjusting terminals. In the first case the adjusting terminals are said to be uncoupled, they are then indicated by the symbol of FIG. 8*c*. In the second case the adjusting terminals are said to be coupled and are indicated by the symbol of FIG. 8*d*. In the latter case reference is made to an adjustment by coincidence. As a matter of course, the pulse generator may have two or more firing windings, which are, however, always uncoupled.

Figure 9:
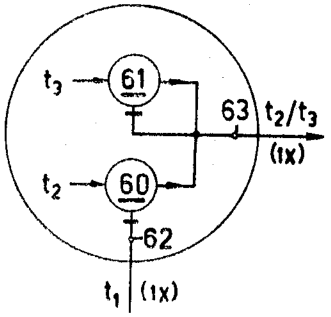
FIG. 9 shows a circuit arrangement which supplies, subsequent to its adjustment, two successive output pulses.

FIG. 9 shows an arrangement which is capable of supplying two pulses one after the other. The arrangement comprises two storing pulse generators 60 and 61, which are connected in the manner shown. The firing terminal of the pulse generator 60 receives, at the instant $t_2$ of each pulse cycle, a clock pulse. The firing terminal of the pulse generator 61 receives a clock pulse at the instant $t_3$ of each pulse cycle. The arrangement operates as follows. It is occupied that the pulse generator 60 is adjusted by a pulse of a pulse cycle occurring once at the instant $t_1$. At the instant $t_2$, following said instant $t_1$, the pulse generator is fired and supplies an output pulse. This output pulse is used to adjust the pulse generator 61 and serves at the same time as an output pulse of the arrangement as a whole. At the instant $t_3$, following the instant $t_2$, the pulse generator 61 is fired, so that it supplies an output pulse, which is at the same time an output pulse of the arrangement as a whole. Then the arrangement can supply two output pulses not until again a pulse is fed to the input terminal 62 thereof, so that the pulse generator 60 is adjusted.

Figure 10:
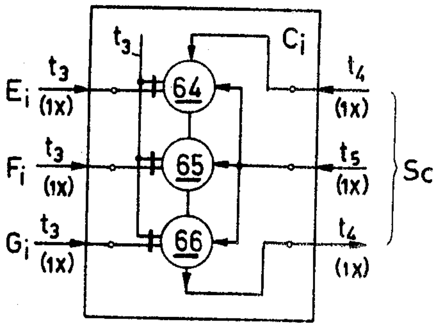
FIG. 10 shows a possible embodiment of a coincidence arrangement.

FIG. 10 shows a possible embodiment of the coincidence circuits of FIG. 6. Each of these coincidence circuits comprises three storing pulse generators 64, 65 and 66, each of which has two coupled input terminals and two firing terminals and which are connected in the manner shown. The arrangement operates as follows: At the instant $t_3$ of each pulse cycle each of the three pulse generators receives a clock pulse at one of its two coupled adjusting terminals. However, this clock pulse changes over the relevant pulse generator to the adjusted state only when at the same time a pulse is received from the pulse amplifier concerned E, F or G (FIG. 6). This structure ensures that the coincidence circuits respond only to pulses received at an instant $t_3$ from the pulse amplifiers E, F and G and they do not respond, in particular, to pulses supplied by these amplifiers at an instant $t_2$, since these pulses do not contain information. The scanning circuit *Sc* tests the coincidence circuit $C_1$ with respect to coincidence of three pulses supplied by the pulse amplifiers E, F and G by firing the pulse generator 64 at the instant $t_4$. Only when the three pulse generators 64, 65 and 66 have previously all been adjusted, i.e. when coincidence has taken place of three pulses supplied by the pulse amplifiers E, F and G the pulse generator 66 supplies a pulse back to the scanning circuit Sc. In order to avoid that any of the pulse generators 64, 65 or 66, after having been scanned by the scanning circuit should be left in the adjusted state the scanning circuit supplies a further pulse at the instant $t_5$, which pulse is used for firing all of the pulse amplifiers 64, 65 and 66. A pulse which may thus be supplied for example by the pulse generator 66 does not contain information.

Figure 11:
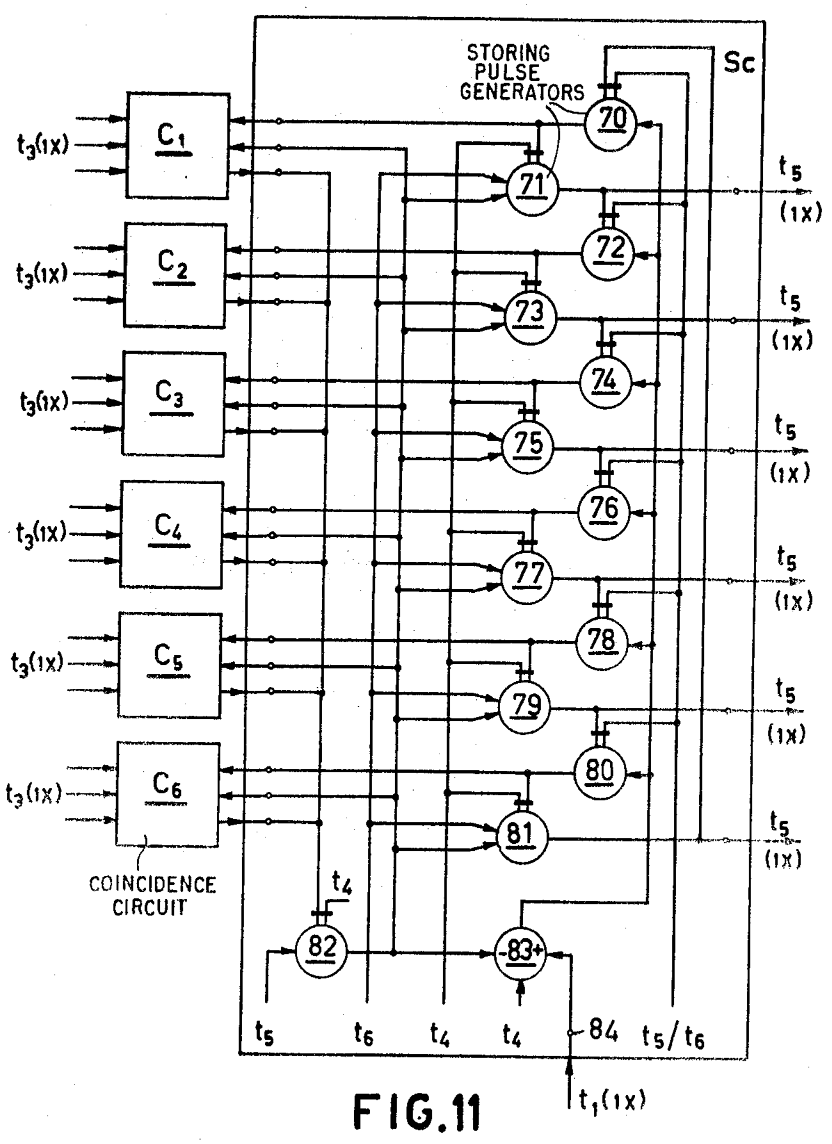
FIG. 11 shows a possible embodiment of a scanning arrangement.

FIG. 11 shows a possible embodiment of the scanning circuit *Sc*, it being supposed that there are six coincidence circuits of the type shown in FIG. 10. This scanning circuit comprises mainly a ring counter built up from twelve storing pulse generators 70, 71, . . . 81 on the principle of the "Wang-line"; a further storing pulse generator 82 and a gate 83. All storing pulse generators have two coupled adjusting terminals. The gate 83 can be driven to the open state by feeding a pulse to the control-terminal indicated by + and into the closed state by feeding a pulse to the control-terminal indicated by —.

This scanning circuit operates as follows. It will be supposed that only the pulse generator 72 is adjusted, that the gate 83 is closed and that only the coincidence circuits $C_1$, $C_3$, $C_4$ have stated coincidence. Finding a free channel between a given input and a given output of the switching network is initiated by feeding a pulse to the terminal 84 at the instant $t_1$ of a pulse cycle. Thus the gate 83 is opened and the clock pulses occurring at the instant $t_4$ are passed. The first of these pulses fires the pulse generator 72 and the pulse supplied by this pulse generator is used to test the coincidence circuit $C_2$ with respect to coincidence and to adjust the pulse generator 73 in coincidence with a clock pulse. Since the coincidence circuit $C_2$ has not stated coincidence, it does not supply a pulse back to the scanning circuit, so that the pulse generator 82 is not adjusted and the clock pulse occurring at the instant $t_5$ does not have any effect. At the instant $t_6$ the pulse generator 73 is fired by a clock pulse and the pulse supplied by this pulse generator is employed to adjust the pulse generator 74 in coincidence with a clock pulse. At the next-following instant $t_4$ said pulse generator is fired, which results in that the coincidence circuit $C_3$ is tested with regard to coincidence and the pulse generator 75 is adjusted in coincidence with a clock pulse. Since the coincidence circuit $C_3$, as is supposed, has stated coincidence, it supplies a pulse back to the scanning circuit. This pulse is used to adjust the pulse generator 82 in coincidence with a clock pulse. At the instant $t_2$ this pulse generator is fired by a clock pulse and the pulse supplied by the pulse generator is used to close the gate 83 and to fire the pulse generator 75. The pulse supplied by this pulse generator at the instant $t_5$ serves as an output pulse and contains the information that the coincidence circuit $C_3$ has stated coincidence, whilst said pulse is used at the same time for adjusting the pulse generator 76 in coincidence with a clock pulse. Since the gate 83 is closed, the scanning circuit stands still until a new order is given to find a free channel. Since the scanning circuit does not exhibit a fixed state or 0 state, a random element is introduced into the choice of the channels, which provides a uniformly distributed wear or aging of the crossings of the switching network, whilst the average finding time for a free channel is shorter and the harmful effect of a disturbance in a channel with a low channel number is reduced.

What is claimed is:

1. In a switching network of the type comprising a plurality of input circuits, a plurality of output circuits, and a plurality of channels extending between each input circuit and output circuit, and wherein each channel comprises a plurality of switch means serially interconnected by a plurality of conducting links whereby the voltages on said links are dependent upon the free and busy state of the respective channel, means for determining the states of said channels comprising a plurality of gate circuit means each having a control terminal, means connecting each said link to the control terminal of a separate gate circuit means whereby the voltage on a link closes the respective gate circuit means in one state of the respective channel and opens the respective gate circuit means in the other state of the respective channel, a plurality of devices having first and second detectable states, direct current conductive means for connecting each gate circuit means to a separate one of said devices for continuously driving the respective device to said first state when the respective gate circuit means is closed, means for driving the device to said second state when the respective gate circuit means is open, and means connected to said devices for detecting by coincidence the free and busy states of said channels.

2. In a switching network of the type comprising a plurality of input circuits, a plurality of output circuits, and a plurality of channels extending between each input circuit and output circuit, and wherein each channel comprises a plurality of switch means serially interconnected by a plurality of conducting links whereby the voltages on said links are dependent upon the free and busy state of the respective channel, means for determining the states of said channels comprising a plurality of transistors, means connecting the emitter-base circuits of each of said transistors to a separate link whereby the transistor conducts when the channel including the respective link is in one state and the transistor is cut off when the channel including the respective link is in the other state, a plurality of cores of material having a rectangular magnetic hysteresis loop, a winding inductively coupled to each of said cores, direct current conductive means for connecting the collector of each transistor to the winding of a separate core whereby when a transistor conducts, collector current continuously drives the respective core to a first magnetic state, means for reading the state of said core comprising winding means for driving said core to the other magnetic state, and means connected to said reading means for detecting by coincidence the free and busy states of said channels.

3. The switching network of claim 2, comprising a separate second winding inductively coupled to each of said cores, and a source of current connected to said second windings for driving said cores to said other magnetic state in the absence of collector current flow in the respective transistor.

4. In a switching network of the type comprising a plurality of input circuits, a plurality of output circuits, and a plurality of channels extending between each input circuit and output circuit, and wherein each channel comprises a plurality of switch means serially interconnected by a plurality of conducting links whereby the voltages on said links are dependent upon the free and busy state of the respective channel, means for determining the states of said channels comprising a plurality of transistors, means connecting the bases of said transistors to separate links, supply voltage means connected to the emitters of said transistors whereby the emitter of transistors connected to links of a given channel have different potentials, a plurality of cores of material having a rectangular magnetic hysteresis loop, means coupling each core to the collector of a separate transistor whereby when collector current flows in a transistor the respective core is driven to a first magnetic state, means for reading the state of said cores comprising winding means for driving the cores to the other magnetic state, and means connected to said cores for detecting by coincidence the free and busy states of said channels.

5. The switching network of claim 4, wherein said means for detecting said free and busy states by coincidence comprises means for selectively reading out said cores, coincidence circuit means, means for applying pulses read out from said cores to said coincidence circuit means, and means for scanning said coincidence circuit means.

References Cited by the Examiner

UNITED STATES PATENTS

| | | | |
|---|---|---|---|
| 2,967,212 | 1/1961 | Burstow et al. | 179—18 |
| 2,972,683 | 2/1961 | Tunney | 179—18 |
| 3,020,353 | 2/1962 | Heetman | 179—18 |
| 3,093,746 | 6/1963 | Burstow et al. | 179—18 |

ROBERT H. ROSE, *Primary Examiner.*

WALTER L. LYNDE, *Examiner.*

S. H. BOYER, *Assistant Examiner.*